United States Patent
Zhang et al.

(10) Patent No.: US 10,552,609 B2
(45) Date of Patent: Feb. 4, 2020

(54) MALICIOUS OBJECT DETECTION IN A RUNTIME ENVIRONMENT

(71) Applicant: INTEL CORPORATION, Santa Clara, CA (US)

(72) Inventors: Mingwei Zhang, Hillsboro, OR (US); Xiaoning Li, Santa Clara, CA (US); Ravi L. Sahita, Beaverton, OR (US); Aravind Subramanian, San Jose, CA (US); Abhay S. Kanhere, Fremont, CA (US); Chih-Yuan Yang, Portland, OR (US); Yi Gai, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 52 days.

(21) Appl. No.: 15/395,053

(22) Filed: Dec. 30, 2016

(65) Prior Publication Data

US 2018/0189489 A1 Jul. 5, 2018

(51) Int. Cl.
G06F 21/56 (2013.01)
H04L 29/06 (2006.01)
G06N 99/00 (2019.01)
G06N 20/00 (2019.01)

(52) U.S. Cl.
CPC ......... *G06F 21/566* (2013.01); *G06F 21/561* (2013.01); *G06N 20/00* (2019.01); *H04L 63/145* (2013.01)

(58) Field of Classification Search
CPC ... H04L 63/145; G06F 21/561; G06F 21/566; G06N 99/005
See application file for complete search history.

(56) References Cited

U.S. PATENT DOCUMENTS

| | | | |
|---|---|---|---|
| 2015/0096023 A1* | 4/2015 | Mesdaq | H04L 63/145 726/23 |
| 2015/0379072 A1* | 12/2015 | Dirac | G06N 99/005 707/693 |
| 2017/0063891 A1* | 3/2017 | Muddu | H04L 63/1425 |
| 2017/0308701 A1* | 10/2017 | Nandha Premnath | G06F 21/53 |

* cited by examiner

*Primary Examiner* — Joseph P Hirl
*Assistant Examiner* — Thomas A Gyorfi
(74) *Attorney, Agent, or Firm* — Grossman, Tucker, Perreault & Pfleger, PLLC (57) ABSTRACT

A malicious object detection system for use in managed runtime environments includes a check circuit to receive call information generated by an application, such as an Android application. A machine learning circuit coupled to the check circuit applies a machine learning model to assess the information and/or data included in the call and detect the presence of a malicious object, such as malware or a virus, in the application generating the call. The machine learning model may include a global machine learning model distributed across a number of devices, a local machine learning model based on use patterns of a particular device, or combinations thereof. A graphical user interface management circuit halts execution of applications containing malicious objects and generates a user perceptible output.

25 Claims, 6 Drawing Sheets

MALICIOUS OBJECT DETECTION IN A RUNTIME ENVIRONMENT

TECHNICAL FIELD

The present disclosure relates to systems and methods for detection of malicious code and/or objects in a runtime environment.

BACKGROUND

Effective Android™ malware detection and prevention is a highly sought-after goal of security companies. However, in the Android system, evasive malware is frequently able to easily bypass traditional signature and pattern based detection systems, rendering almost all anti-malware software useless against evolving or new malware threats. Current Android security software relies on the static analysis of application packages. However, such static analysis is known to be ineffective for several reasons. First, malware may update only at runtime and thus, may go undetected using static analysis. Second, malware often uses some form of obfuscation to bypass analysis.

Due to constraints within the Android operating environment, security software deployed on devices running the Android operating system typically rely upon whitelisting or signature based checking while a majority of the Android malware detection is focused on cloud-based or cloud-implemented solutions. GOOGLE® Bouncer is just one example of a cloud based Android malware detection solution. However, malware may escape such sandboxed protection systems using simple strategies such as time delay activation that delays the trigger of malicious behavior and enables the malware after passage of an amount of time sufficient to clear screening.

Android applications consist mainly of Dalvik bytecode. Prior to Android version 4.3 ("Jelly Bean") the Dalvik bytecode was executed using an interpreter and a just-in-time (JIT) compiler inside Android runtime. Android version 4.4 ("KitKat") introduced Android Runtime (ART) environment as a technology preview while retaining Dalvik. Beginning with Android version 5.0 ("Lollipop") ART represented the only included runtime environment. ART uses an interpreter similar to prior Android versions, but introduced the concept of ahead-of-time (AOT) compilation. Android 7 (codename: Nougat) adds just-in-time compilation as well. AOT compilation performs the translation of the application bytecode into native instructions for later execution within the device's runtime environment. Unlike Dalvik, ART is able to compile entire applications into native machine code upon installation on the device.

To maintain backward compatibility, ART uses the same bytecode as Dalvik, supplied via DEX files, while the ODEX files are replaced with executable and linkable format (ELF) executables. Once an application is compiled using ART's on-device dex2oat utility, it runs primarily from the compiled ELF executable.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

In contrast to static malware detection systems, dynamic behavior based monitoring provides more robust malware detection capabilities within Android™ based systems. However, such dynamic monitoring systems are difficult to implement within an Android environment. For example, the "always running" nature of such dynamic systems leads to high resource consumption since the dynamic monitoring and instrumenting applications increases the demand placed on portable and/or battery powered systems.

The systems and methods presented herein provide effective malware detection on Android-based devices. The systems and methods described herein perform an instrumentation at runtime while maintaining transparency to applications executed/executing on the device. Thus, the systems and methods described herein beneficially do not require repackaging or resigning the application. The systems and methods described herein advantageously incur very low overhead penalties to both the power source (e.g., battery) and the central processing unit (CPU) since the instrumentation is inserted inline using a security enhanced compiler. Additionally, the systems and methods described herein advantageously leverage the benefits of machine learning at both the device level and the cloud level to provide more robust and responsive malware detection capabilities. The use of machine learning instead of patterns or signatures improves malware detection accuracy while minimizing false positives. Furthermore, the local machine learning systems and methods employed at the device level beneficially limit or even eliminate the transmission of sensitive user information and/or data to a remote Web or cloud based malware detection system.

The systems and methods described herein provide a practical instrumentation system for monitoring program behavior at the runtime application programming interface (API) level. The systems and methods described herein intercept a set of critical API functions originating with user applications (Dalvik code) and forward the intercepted API functions to a local service that stores the API trace in an on-device database. This is accomplished using instrumentation added by the ART runtime's interpreter and JIT/AOT compilers while interpreting or compiling the DEX invokes to monitored APIs. If the machine learning model predicts or identifies the trace as malicious (e.g., if the trace differs from a trace generated during a prior call to the API), the target application can be quarantined. Experimentally, such systems and methods have quickly and efficiently detected malware, with high accuracy (92%) and with a low false positive rate (1%) using an 86,000 APK data set that included 30,000gook APKs and 56,000 malware APKs.

It should be noted that although the Android runtime environment is discussed in detail and used as an illustrative runtime environment to demonstrate the systems and methods described herein, those of skill in the art will readily appreciate the applicability of the systems and methods described herein across a broad spectrum of managed runtime systems. Such systems may include any system in which the detection of malicious objects provides significant improvement in the safety and reliability of an application by providing an enhanced level of security heretofore unavailable in such managed runtime systems, particularly when implemented on compact, portable, wearable, and/or handheld processor-based devices.

A system to detect malicious code in a managed runtime system on a processor based device is provided. The system may include a check circuit to detect an occurrence of a defined event during the runtime of an application executing on the processor-based device; a management circuit communicably coupled to the check circuit, the management circuit including: a machine learning circuit to: assess data communicated by the application to access a resource responsive to detecting the occurrence of the defined event; and determine whether the data communicated by the application is indicative of a presence of a malicious object in the application.

A method of detecting malicious code in a managed runtime system on a processor-based device is provided. The method may include detecting, by a check circuit, an occurrence of a defined event during the runtime of an application executing on the processor-based device; responsive to detecting the occurrence of the defined event, selectively causing a machine learning circuit communicably coupled to the check circuit to assess data communicated by the application to access a resource; and determining, by the machine learning circuit, whether the data communicated by the application is indicative of a presence of a malicious object in the application.

A non-transitory computer readable medium is provided. The non-transitory computer readable medium may include executable instructions that, when executed by a circuit in a processor-based device cause the transformation of the circuit to a specific circuit to detect malicious code in a managed runtime system. The circuit may detect an occurrence of a defined event during a runtime of an application executed by the processor-based device; assess data communicated by the application to access a resource responsive to detecting the occurrence of the defined event; and determine whether the data communicated by the application is indicative of a presence of a malicious object in the application.

A system to detect malicious code in a managed runtime system on a processor based device is provided. The system may include a means for detecting an occurrence of a defined event during the runtime of the application executing on the processor-based device; a means for assessing data communicated by the application to access a resource responsive to detecting the occurrence of the defined event; and a means for determining whether the data communicated by the application is indicative of a presence of a malicious object in the application.

Figure 1:
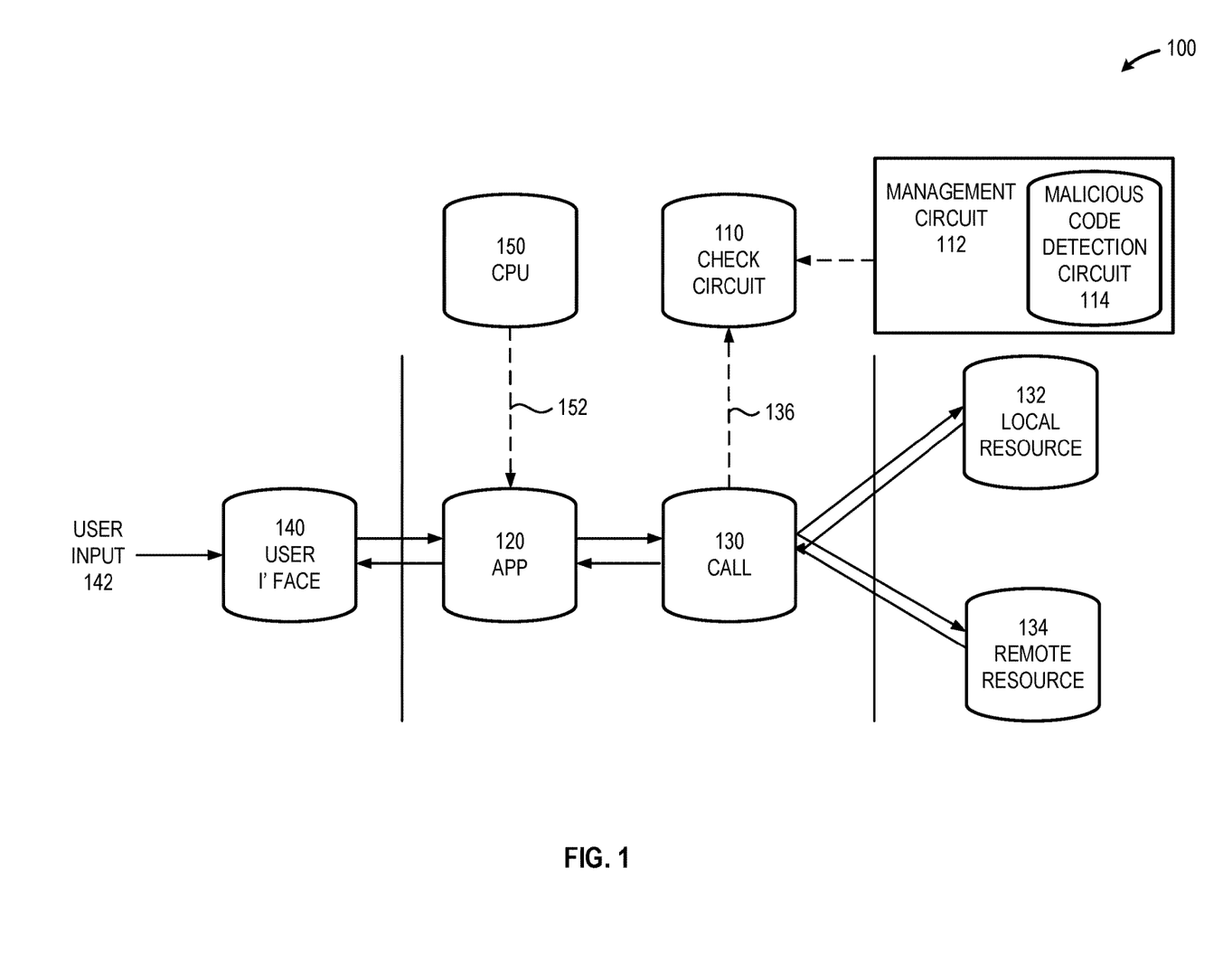
FIG. 1 is a schematic diagram of an illustrative system in which a check circuit receives information and/or data associated at least some of the calls generated by an application during a runtime of the application to detect the presence of malicious code based at least in part on the information and/or data included in the call, in accordance with at least one embodiment described herein.

FIG. 1 provides a schematic diagram of an illustrative system 100 in which a check circuit 110 receives information and/or data 136 associated with at least a portion of the calls 130 (e.g., API calls) made during runtime of an application 120, in accordance with at least one embodiment described herein. In at least some implementations, such calls 130 may be made in a managed runtime environment such as an Android™ runtime environment. The system 100 may beneficially detect the presence of malicious code in the application 120 based at least in part on the information and/or data included in the call 130.

In implementations, the call 130 may include one or more Android application programming interface (API) calls to invoke one or more local library functions 132 and/or one or more remote library functions 134. In such implementations, the API call 130 may include a call sequence in which information and/or data is exchanged in a defined sequence or order. In such implementations, an instrumentation 152 executed by a central processing unit 150 may cause the transfer of some or all of the information and/or data 136 included in the API call sequence from the API call 130 to the check circuit 110.

While executing in the runtime environment, the application 120 may generate or otherwise cause at least one API call 130 to access one or more resources external to the application itself. In some implementations, the API call 130 may cause the application 120 to send, receive, and/or exchange information and/or data with the one or more local library functions 132. In some implementations, the API call 130 may cause the application 120 to send, receive, and/or exchange information and/or data with the one or more remote library functions 134, for example one or more server- or cloud-based library functions 134.

In other implementations, all or a portion of the application 120 may be compiled during the initial installation of the application 120 on the processor-based device 100. In such implementations, the check circuit 110 and/or the management circuit 112 may modify the compiled program by inserting a call to the instrumentation 152 prior to executing the function call. Such may occur, for example, in an Android Run Time (ART) environment included in Android versions 4.4 and higher.

The check circuit 110 may assess some or all of the information and/or data 136 included in the call 130 to detect the existence of malicious code and/or objects in the application 120. Such malicious code may include, but is not limited to, viruses and/or malware. The check circuitry 110 beneficially detects the presence of such malicious code and/or objects during the runtime of the application 120 thereby permitting the detection delayed action malware (i.e., malware active only in a runtime environment) and/or obfuscated malware present in the runtime application and that may have been missed during previous screening efforts. In some implementations, the check circuit 110 is disposed, in whole or in part, in the central processing unit (CPU) of the processor-based system 100. In some implementations, the check circuit 110 may include, incorporate, or be communicably coupled to a management circuit 112.

The check circuit 110 receives information and/or data 136 from calls 130 or similar requests made by the application 120 to access local resources 132 and/or remote resources 134 (collectively "resources"). Such resources may include, but are not limited to, library routines, data files, data structures, blocks of standard code, information obtained via one or more networks (e.g., local area networks, wide area networks, Internet), or combinations thereof. The calls 130 may include, but are not limited to, API calls made by an application, function calls made by a compiled application, and similar. In some implementations, the check circuit 110 may receive at least a portion of the information and/or data 136 from every call 130 made by an application 120. In some implementations, the check circuit 110 may receive at least a portion of the information and/or data 136 from selected calls (e.g., every second or third call 130) made by an application 120. In some implementations, the check circuit 110 may receive at least a portion of the information and/or data 136 from randomly selected calls 130 made by a runtime application 120. In some implementations, the check circuit 110 may select different numbers of calls 130 based on the type or class of request made by the application (e.g., every call to access financial information may be screened while only selected or random calls to access information from an authenticated Website may be screened). In some implementations, the check circuit 110 may select a different number of calls 130 or employ a different method of selecting calls 130 for screening based on the type of application generating the call 130 (e.g., calls generated by email applications may be screened more frequently than calls generated by a news aggregation application).

In embodiments, the check circuit 110 receives the information and/or data 136 from the call 130 and forwards at least a portion of the received information and/or data to the malicious code detection circuit 114. The received information and/or data may include, but is not limited to, requests for access to: one or more predefined code blocks, locally stored information (contacts, photos, audio files, etc.), remotely stored information and/or data, and the like.

The malicious code detection circuit 114 uses at least a portion of the information and/or data 136 received from the check circuit 110 to assess a likelihood that the runtime application 120 responsible for generating the call 130 includes malicious code and/or objects. In embodiments, the malicious code detection circuit 114 may assess whether the application 120 includes malicious code, based at least in part on whether the information and/or data requests included in the call 130 are authorized and/or appropriate. The malicious code detection circuit 114 may perform such a determination based, at least in part, on historical performance information associated with the respective, currently executing, application 120 (e.g., has the application made calls 130 containing similar information and/or data 136 in prior sessions). The malicious code detection circuit 114 may perform such a determination based, at least in part, on historical user inputs and/or behaviors associated with the runtime application 120 (e.g., based on past user interaction with the application 120, were similar calls 130 made in prior sessions). Advantageously, the ability of the malicious code detection circuit 114 to adapt and adjust to device- and user-specific operational criteria beneficially enhances the ability of the malicious code detection circuit 114 to detect malicious code in the runtime application 120, thereby providing capabilities unavailable in current runtime environments, such as an Android runtime environment.

In implementations, user behaviors and/or inputs to the processor-based device 100 may provide important information in identifying whether an application 120 has been compromised by malicious code and/or contains a malicious object. For example, if a user typically accesses financial information using a first application 120A, the malicious code detection circuit 114 may flag, logically associate, or otherwise identify the first application 120A as authorized to access such financial information. If, on the other hand, a second application 120B attempts to access financial information stored on the processor-based device 100, the malicious code detection circuit 114 may indicate such access is not authorized and indicative of the presence of malicious code in the second application 120B. Thus, incorporation of such a management circuit 112 that includes a malicious code detection circuit 114 capable of detecting the presence of malicious code in runtime applications represents a significant and innovative step over traditional non-runtime virus and malware detection hardware and software which often relies upon static detection of malware binaries.

In implementations, instrumentation executed by a central processing unit (CPU) 150 may cause the check circuit 110 to receive information and/or data included in a call generated by a runtime application 120. For example, an instrumentation 152 or similar instructions (e.g., modified trampoline code that includes additional calls inserted into the compiled application 120 source code, e.g., inserted into compiled Android application source code) may cause the transfer of information and/or data 136 to the check circuit 110. Some or all of the information and/or data included in the call 130 is transferred to the check circuit 110, as the application 120 is executed by the processor-based device 100.

In some implementations, the check circuit 110 may include one or more circuits implemented, created, prepared, configured, or otherwise formed as a result or consequence of one or more machine readable instructions, logic sets, or programming executed by the processor-based device 100. In some implementations, some or all of the check circuit 110 may be implemented in the form of electronic components, semiconductor devices, and/or logic gates disposed in the CPU 150. In some implementations, some or all of the check circuit 110 may be disposed on a programmable gate array (PGA), an application specific integrated circuit (ASIC), a system-on-a-chip (SoC), a controller, a digital signal processor, or similar.

The management circuit 112 may include additional circuits, some of which will be discussed in greater detail with regard to FIG. 2. The management circuit 112 may include one or more malicious code and/or object detection circuits 114 capable of detecting the presence of malicious code and/or a malicious object in the runtime application 120 based on the content of one or more calls 130 made by the respective runtime application 120. In implementations, the management circuit 112 may reconfigure, change, amend, or otherwise alter the malicious code detection circuit 114 to reflect various relationships and/or weights associated with the detection of malicious code based on inputs provided by the device user, one or more prior or previous API calls 130 made by the respective application 120, or combinations thereof.

In embodiments, the management circuit 112 may update the malicious code detection circuit 114 on an intermittent, periodic, or aperiodic basis. In some implementations, the management circuit 112 may receive such updates via an over-the-air or similar broadcast received from one or more remote resources, such as one or more remote servers or similar. In some implementations, the management circuit 112 may receive at least a portion of the update via a tethered or wireless network connection, such as a tethered or wireless connection to the Internet.

In embodiments, the malicious code detection circuit 114 may be disposed in whole or in part within the management circuit 112. In embodiments, some or all of the management circuit 112 and/or the malicious code detection circuit 114 may be disposed in or otherwise partially or completely formed electronic components, semiconductor devices, and/or logic elements disposed in the central processing unit (CPU) 150. In some implementations, the management circuit 112 and the malicious code detection circuit 114 may be formed, wired, coupled, or otherwise assembled or created in a common device, such as a programmable gate array (PGA), an application specific integrated circuit (ASIC), a system-on-a-chip (SoC), a controller, a processor, a microprocessor, a digital signal processor (DSP), or numbers and/or combinations thereof. In some implementations, at least a portion of the management circuit 112 and/or the malicious code detection circuit 114 may be implemented as conductively coupled, discrete electronic components, semiconductor devices, and/or logic elements. In some implementations all or a portion of the management circuit 112 and/or the malicious code detection circuit 114 may be implemented on one or more remote resources, such as one or more remote servers or similar cloud-based devices and/or resources.

The CPU 150 may include any current or future developed processor, microprocessor, or controller capable of providing an operating environment or a virtualized operating environment in which an application executed. The processor-based device 100 includes, but is not limited to, any portable device, such as a smartphone, tablet computer, wearable computer, portable computer, netbook, handheld computer, and similar.

Figure 2:
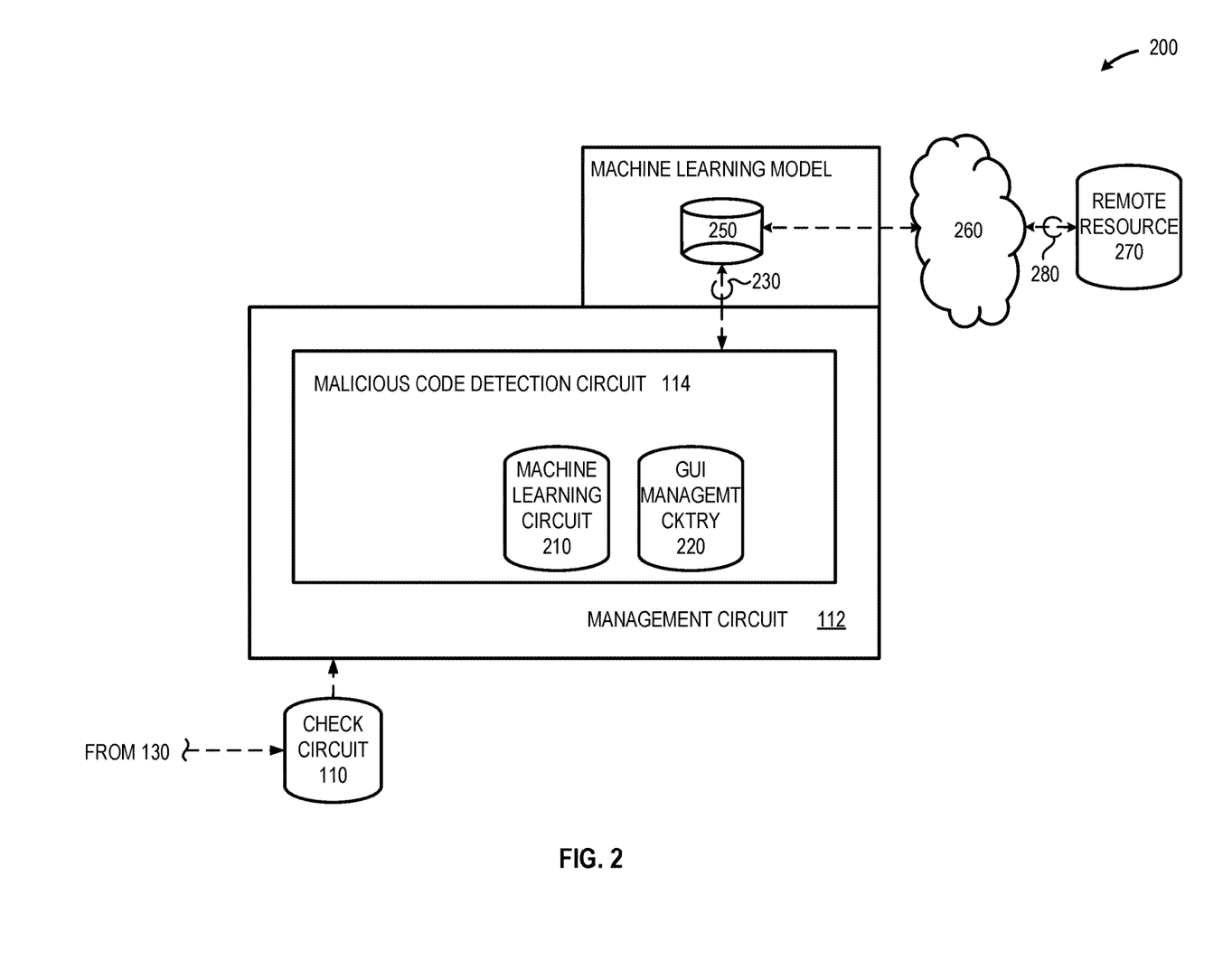
FIG. 2 is a block diagram of an illustrative check circuit communicably coupled to an illustrative management circuit at least a portion of the management circuit is used to provide a malicious code detection circuit that includes a machine learning circuit and a graphical user interface (GUI) management circuit, in accordance with at least one embodiment described herein.

FIG. 2 provides a block diagram of an illustrative check circuit 110 communicably coupled to an illustrative management circuit 112 at least a portion of which provides the malicious code detection circuit 114 that includes at least: a machine learning circuit 210, and a graphical user interface (GUI) management circuit 220, in accordance with at least one embodiment described herein. As depicted in FIG. 2, the management circuit 112 may communicably couple to the check circuit 110 and to one or more storage devices or similar data retention devices 240 capable of storing, holding, or otherwise retaining data representative of a machine learning model 250. The one or more data storage and/or retention devices disposed in whole or in part in, on, or about the processor-based device 100.

A global machine learning model 280 may be received from one or more remote resources 270 via network 260. The global machine learning model 280 may be incorporated, in whole or in part, into the machine learning model 250 implemented as the machine learning circuit 210. Furthermore, a local (i.e., user and/or device specific) machine learning model 230 may be received from the management circuit 112. All or a portion of the local machine learning model 230 may be combined with all or a portion of the global machine learning mode 280 to provide a custom machine learning model 250 specific to the user and/or processor-based device 100. The machine learning circuit 210 implements the custom machine learning model 250 to detect the presence of malicious code and/or malicious objects in a runtime application 120 based on the information and/or data included in one or more calls 130 generated by the respective application 120.

In implementations, the global machine learning model 280 may include data representative of the information and/or data included in a plurality of representative call sequences (e.g., API call sequences). Such data representative of a plurality of the information and/or data included in representative call sequences may be collected or otherwise gathered from a plurality of processor-based devices 100A-100n, thereby beneficially leveraging the learning capabilities of numerous devices. In some implementations, the API call sequences received from the remote resource 270 may be stored locally in one or more non-transitory storage devices communicably coupled to the processor-based device 100.

In some embodiments, the local machine learning data 230 incorporated into the custom machine learning model 250 by the management circuit 112 (i.e., the machine learning data unique to the user of the processor-based device 100 or to the processor-based device 100 itself) remains local to the processor-based device 100. In other embodiments, some or all of the local machine learning data 230 incorporated into the custom machine learning model 250 by the management circuit 112 may remain anonymized prior to communication to the remote resource 270 for incorporation, in whole or in part, into the global machine learning model 280. Thus, an entire or global "community" of Android devices may contribute to the development of the global machine learning model 280. This permits the rapid detection of malicious code in Android applications and the expeditious deployment of a global machine learning model across a large number of Android devices. Capabilities that do not exist within the framework of current, non-run time, malware detection.

In implementations, the local machine learning data 230 may include data representative of the information and/or data included in one or more representative call sequences. Such data representative of the information and/or data included in representative call sequences may be collected or otherwise gathered during the routine operation of the processor-based device 100 or when an application 120 is initially installed or deployed to the processor-based device 100. In some implementations, the call sequences may be stored locally in one or more non-transitory storage devices communicably coupled to the processor-based device 100. When the local machine learning data 230 is combined in whole or in part with the global machine learning model 280, a machine learning model custom to the processor-based device 100 may result.

The machine learning circuit 210 may include any number and/or combination of systems and devices capable of ascertaining, assessing, or otherwise determining whether malicious code and/or malicious objects exists within the runtime application 120 based, at least in part, on the information and/or data included in one or more calls 130 generated by the runtime application 120. The management circuit 112 may include all or a portion of the machine learning circuit 210. In some implementations, the machine learning circuit 210 includes configurable elements, such as electrical components, semiconductor devices, and/or logic devices, that are conductively coupled and/or arranged to provide or otherwise implement the custom machine learning model 250 stored or otherwise retained on the storage device 240. In some implementations, the machine learning circuit 210 may access one or more resources within the processor-based device 100. For example, the machine learning circuit 210 may, at times, access one or more databases, data structures, or data stores containing information and/or data indicative of a variety of malicious code (virus signatures, malware signatures, etc.). Beneficially, the machine learning circuit 210 (and the personal information contained therein) remains on the processor-based device 100 and is not communicated to a remote location.

The machine learning circuit 210 may be used to implement as a hardware device, any form of machine learning algorithm or regime adaptable or adapted to detection of malicious code based on the calls 130 generated or otherwise initiated by the runtime application 120. Such machine learning algorithms implemented or implementable by the machine learning circuit 210 include, but are not limited to: linear regression analysis; logistic regression analysis; decision tree analysis; support vector machine (SVM) analysis; naïve Bayes analysis; K-Nearest neighbors analysis; K-Means analysis; random forest analysis; dimensionality reduction algorithms; gradient boosting and AdaBoost algorithms; or combinations thereof.

The management circuit 112 may include a graphical user interface (GUI) management circuit 220. The GUI management circuit 220 generates or otherwise causes the user interface on the processor-based device 100 to display information and/or data associated with detected malicious code and/or malicious objects in the runtime application 120. In implementations the GUI management circuit 220 causes the user interface of the processor-based device 100 to display an indication when malicious code is detected in the executing application. In some implementations, the GUI management circuit 220 may generate or otherwise cause the user interface on the processor-based device 100 to display an indication of whether the currently executing application is "SAFE" (i.e., no malicious code has been detected in the runtime application 120) or "UNSAFE" (malicious code has been detected in the runtime application 120). Such an indication may be provided via text, via graphical indicators, or via a combination of text and graphical indicators. In some implementations, the GUI management circuit 220 may provide the device user with a mechanism for halting the application 120 or even removing the application 120 from the processor-based device 100 upon detecting malicious code in the runtime application 120.

Figure 3:
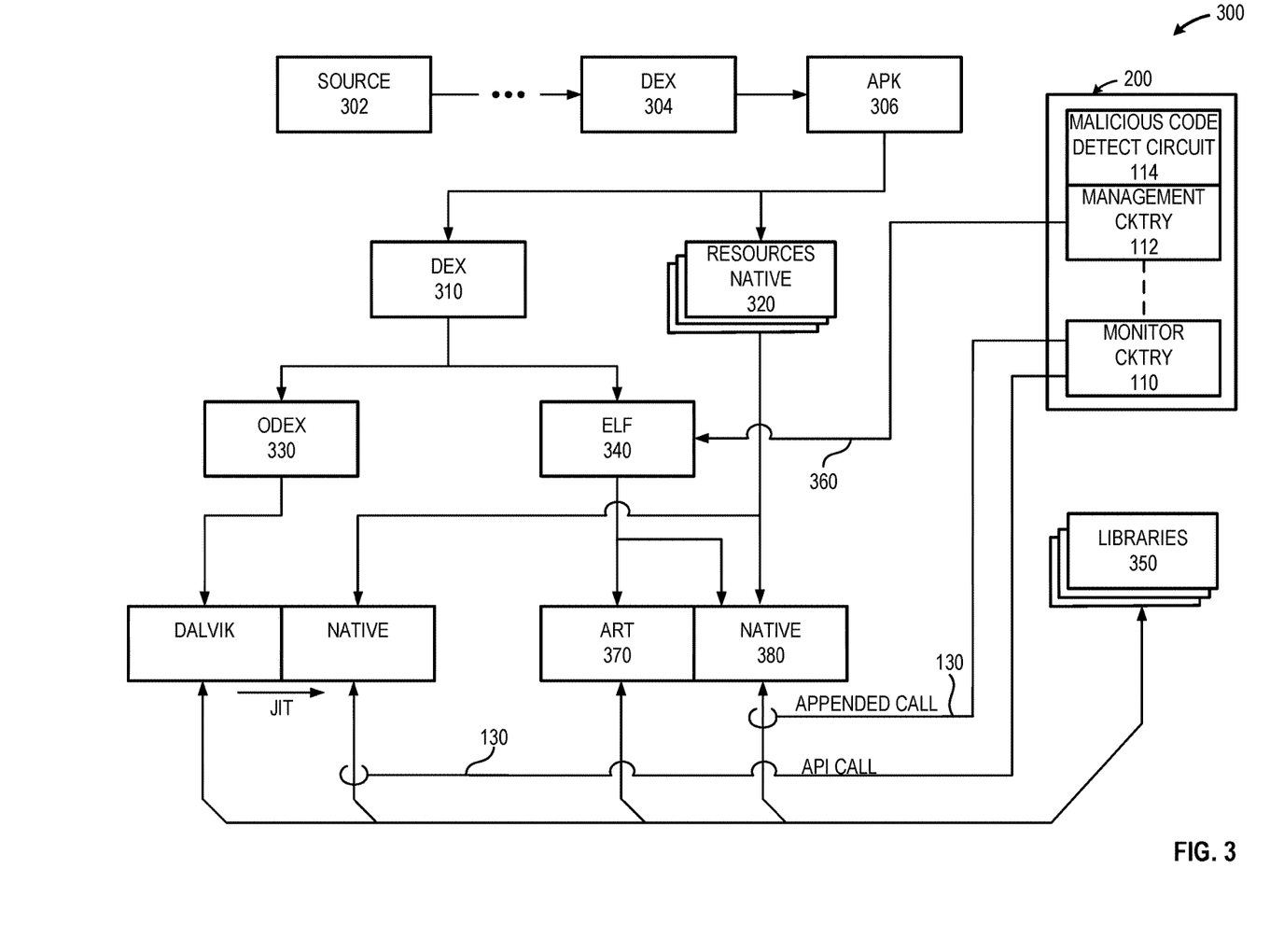
FIG. 3 is a block flow diagram of an illustrative application execution environment that includes a malicious code detection system, in accordance with at least one embodiment described herein.

FIG. 3 depicts a block flow diagram of an illustrative Android managed runtime system 300 that includes a malicious code detection system, in accordance with at least one embodiment described herein. As depicted in FIG. 3, an Android application package (APK) 306 is created by translating the application source code 302 to a Dalvik bytecode file 304. The APK 306 is installed on the processor-based device 100. Various Android versions may include a just-in-time (JIT) compiler, an ahead-of-time (AOT) compiler, or both a just-in-time (JIT) and an ahead-of-time (AOT) compiler.

Resources and native code 320 are incorporated into the Dalvik executable at the time the ODEX file 330 is compiled (i.e., as the Android application 120 is executed). In contrast, resources and native code 320 is incorporated into the ELF executable file at the time of compilation. As depicted in FIG. 3, during the execution of an ODEX Android application, the information and/or data included in some or all of the API calls 130 to one or more libraries 350 during the execution of the Android application 120 is forwarded to the check circuit 110. Under Android versions 4.4 and higher using ART, the management circuit 112 may insert an additional call 360 into the compiled, executable code of the Android application 120. The inserted call 360 provides functionality similar to that previously described with regard to the API call 130. Upon execution, the additional call 360 inserted by the management circuit 112 the information and/or data included in the call is forwarded to the check circuit 110.

In instances where the target of a call is unknown until runtime, for example in Dalvik code, reflection may be used to call a function name that is specified using only a variable generated at runtime. In such implementations, at least some, and in some instances every, reflection call may be instrumented and a piece of code inserted to compare function names. However, performing such a function name comparison prior to every reflection may incur significant processor overhead. One method of avoiding such a comparison is to modify a data structure such as a managed runtime's internal implementation of Managed Method being executed to represent a function regardless of the execution mode of the function. The implementations may be modified by adding a field containing data indicative of whether the associated function is sensitive or not. Additionally, a code snippet may be added to the instrumentation providing the information and/or data to the check circuit 110 that checks the additional field within the implementation such that instrumentation calls are made only for designated function calls.

Figure 4:
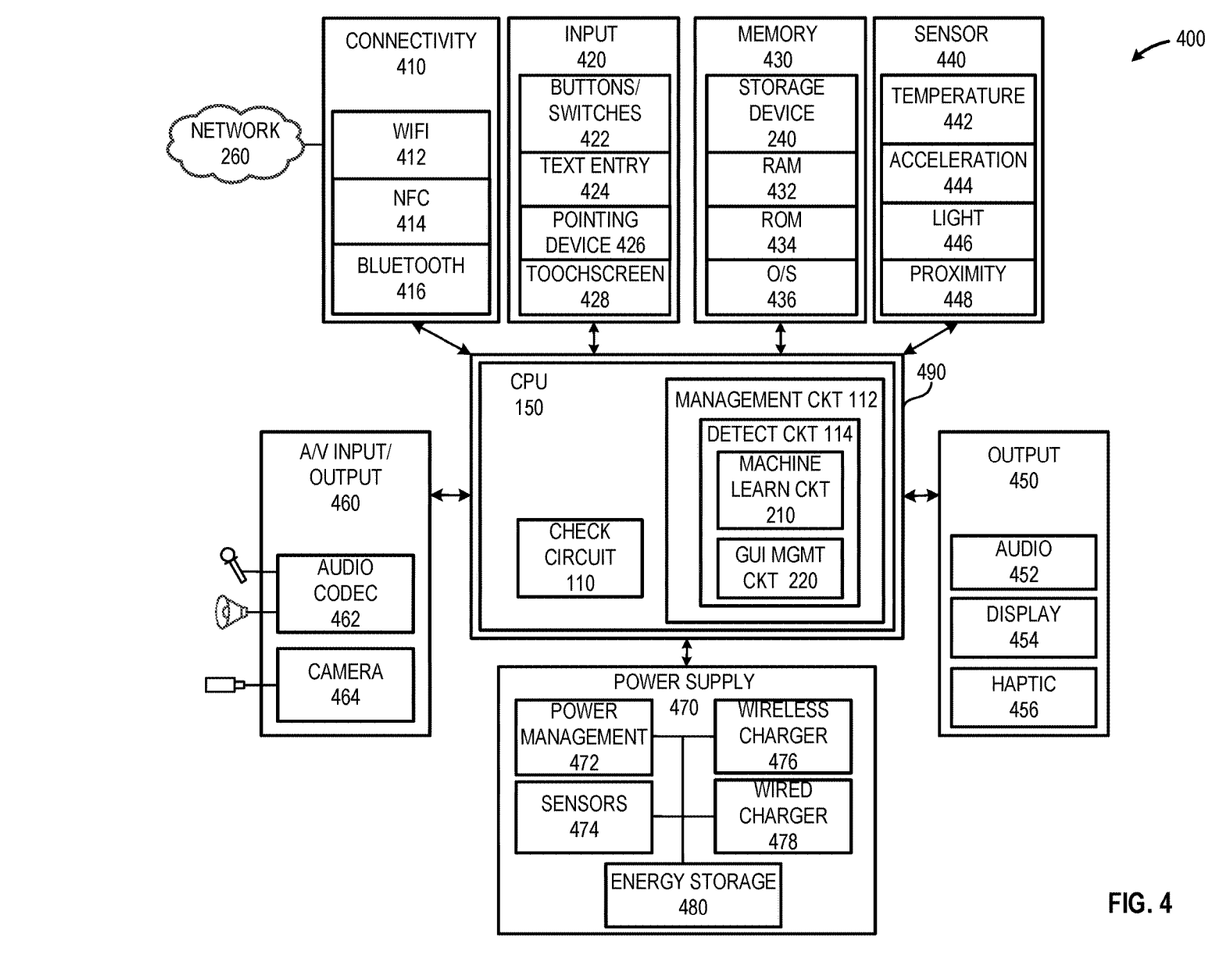
FIG. 4 is a block diagram of a processor-based device that includes circuitry forming a malicious code detection system for use in a runtime environment, in accordance with at least one embodiment of the present disclosure.

FIG. 4 depicts a block diagram of a processor-based device 400 that includes a malicious code detection system for use in a managed runtime environment, in accordance with at least one embodiment of the present disclosure. The processor-based device 400 may include one or more of the following: a connectivity subsystem 410; an input subsystem 420; a memory subsystem 430; a sensor subsystem 440; an output subsystem 450; an audio/visual (A/V) input/output (I/O) system 460; and a power supply subsystem 470. The various subsystems may be communicably coupled to the central processing unit 150 and/or the check circuit 110 and management circuit 120 via one or more communications links 490. For example, via one or more serial or parallel buses 490 or similar pathways capable of supporting the transfer of digital information.

The connectivity subsystem 410 may include any number and/or combination of wired and/or wireless transmitters, receivers, and/or transceivers. Example transceivers include, but are not limited to, one or more IEEE 802.11 (Wi-Fi®) transceivers 412; one or more Near Field Communication (NFC) transceivers 414; one or more BLUETOOTH® transceivers 416; or any combination thereof. In at least some implementations, the connectivity subsystem 410 enables the processor-based device 400 to communicably couple to one or more external devices via one or more networks 260. The one or more networks 260 may include, but are not limited to, one or more local area networks (LANs); one or more metropolitan area networks (MANs); one or more virtual private networks (VPNs); one or more wide area networks (WANs); and/or one or more worldwide are networks (WWANs, such as the Internet). In at least some implementations, updates to the global machine learning model may be received via the one or more networks 260.

The input subsystem 420 may include any number and/or combination of devices and/or systems capable of receiving user input and providing one or more signals including information and/or data corresponding to the received user input to the CPU 150 and/or the management circuit 112. The input subsystem 420 may include input devices such as one or more buttons or switches 422; one or more keyboards or similar text entry devices 424; one or more pointing devices 426; and/or one or more touchscreens 428.

The memory subsystem 430 may include any number and/or combination of devices and/or systems capable of storing or otherwise retaining digital information and/or data. The memory subsystem 430 may include random access memory (RAM) 432 and/or read-only memory (ROM) 434 in a fixed or removable format. In some implementations, the memory subsystem 430 may store or otherwise retain machine-readable instruction sets such as bootstrap code to enable the loading of the Android operating system 436 upon startup of the processor-based device 400.

The memory subsystem 430 may include memory configured to hold information and/or data generated during the operation of processor-based device 400. Such memory may include, but is not limited to, static RAM (SRAM) or Dynamic RAM (DRAM). The ROM 434 may include storage devices such as basic input/output system (BIOS) memory configured to provide instructions when the processor-based device 400 activates, programmable memories such as electronic programmable ROMs, (EPROMS), Flash, etc. The memory subsystem 430 may include other fixed and/or removable memory such as floppy disks, hard drives, etc., electronic memories such as solid state flash memory (e.g., eMMC), removable memory cards or sticks (e.g., uSD, USB), optical memories such as compact disc-based ROM (CD-ROM), or combinations thereof. The memory subsystem 430 may further include the one or more storage devices 240. In embodiments, the one or more storage devices 240 may store or otherwise retain information and/or data representative of the machine learning model 250.

The memory subsystem 430 may include data, machine-readable instruction sets, and/or applications 438 that cause the management circuit 112 to insert calls into an ELF file 340 generated by compiled Android application 120. The memory subsystem 430 may include data, machine-readable instruction sets, and/or applications 438 that cause the management circuit 112 to insert calls proximate at least a portion of the function calls in a compiled application file 340. The memory subsystem 430 may include data, machine-readable instruction sets, and/or applications 438 that cause the management circuit 112 to generate a check circuit 110 capable of extracting information and/or data included in one or more calls 130 generated or otherwise initiated by a runtime application 120.

The sensor subsystem 440 may include any number and/or combination of devices and/or systems capable of detecting one or more internal and/or external parameters and/or conditions and generating one or more signals containing information and/or data representative of the respective detected parameter and/or condition. The sensor subsystem 440 may include, but is not limited to, one or more temperature sensors 442; one or more acceleration sensors 444; one or more light sensors 446; one or more proximity sensors 448; or combinations thereof.

The output subsystem 450 may include any number and/or combination of devices and/or systems capable of generating one or more user perceptible outputs. The output subsystem 450 may include: one or more audio output device 452, one or more display devices 454, one or more haptic output devices 456, or combinations thereof. The A/V Input/Output (I/O) subsystem 460 may include any number and/or combination of current and/or future developed devices and/or systems capable of receiving and/or transmitting audio data and/or video data. The A/V I/O system 460 may include, but is not limited to, one or more audio coders; one or more audio decoders; one or more audio codecs 462; one or more video capture devices 464; or combinations thereof. In some implementations, the one or more video capture devices may include one or more visible spectrum video capture devices and/or one or more infrared video capture devices.

The power supply subsystem 470 may include any number and/or combination of any current and/or future developed devices and/or systems capable of providing the processor-based device 400 with operating power. The power supply subsystem 470 may include, but is not limited to, one or more power management control circuits 472; one or more power sensors 474 (voltage sensors, current sensors, etc.); one or more wireless charging systems 476; one or more wired charging systems 478; one or more energy storage devices 480 (secondary batteries, supercapacitors, ultracapacitors, etc.) or combinations thereof.

Figure 5:
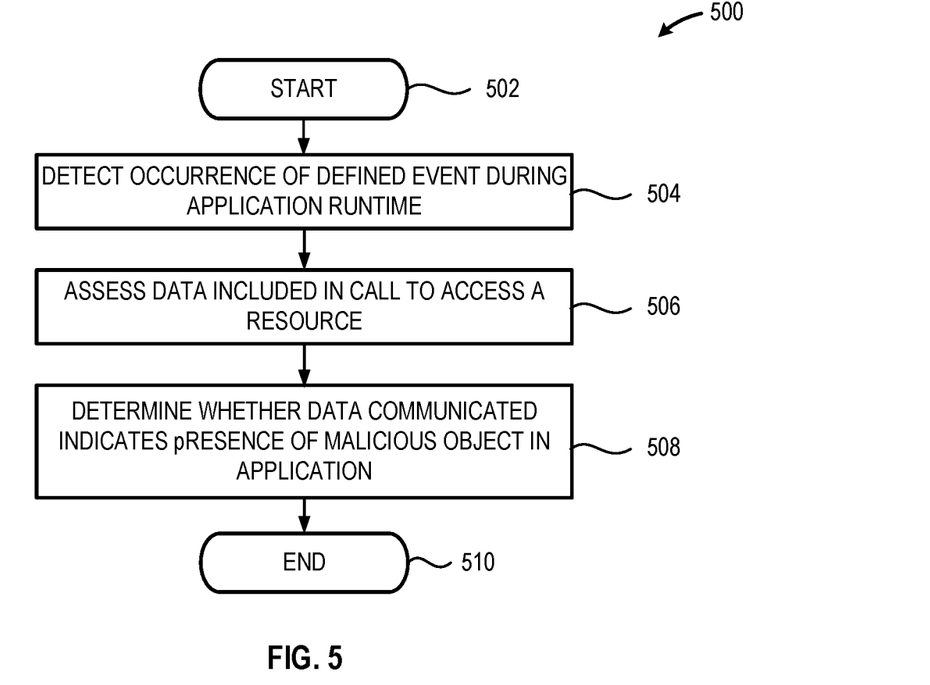
FIG. 5 is a high-level flow diagram of an illustrative malicious object detection method to detect a malicious object in a runtime application, in accordance with at least one embodiment described herein.

FIG. 5 provides a high-level flow diagram of an illustrative malicious object detection method 500, in accordance with at least one embodiment described herein. In some implementations, a check circuit 110 may receive information and/or data from one or more API calls 130 made by an Android application while the application is executing on a processor-based based device 100. A machine learning circuit 210 may assess the information and/or data received by the check circuit 110 and determine whether the received information and/or data indicates the presence of one or more malicious objects in the Android application. The method 500 commences at 502.

At 504, a check circuit 110 detects an occurrence of a defined event during the runtime of an application 120 in a processor-based device 100. In some implementations, the defined event may include a function call 130 or similar generated by the runtime application 120. In some implementations, the defined event may include a check circuit call previously inserted by a management circuit 112 into a compiled application 120. In some implementations, the defined event may include any event that includes a resource (e.g., information and/or data) access external to the runtime application 120. Such accesses may include, but are not limited to: obtaining data from a resource external to the runtime application 120; obtaining defined blocks of code; or similar.

At 506, a machine learning circuit 210 may assess the information and/or data received by the check circuit at 504. In some implementations, the machine learning circuit 210 may assess only a portion of the information and/or data received by the check circuit 110. In some implementations, the machine learning circuit 210 may assess all of the information and/or data received by the check circuit 110. In some implementations, the machine learning circuit 210 may selectively assess the information and/or data received from the check circuit 110 based on the type or nature of the call 130 generated or initiated by the runtime application 120. In some implementations, the machine learning circuit 210 may selectively assess the information and/or data received from the check circuit 110 based on the type of runtime application 120 generating or initiating the call 130. In some implementations, the machine learning circuit 210 may selectively assess the information and/or data received from the check circuit 110 based on one or more user inputs received by the processor-based device 100. In some implementations, the machine learning circuit 210 may selectively assess random portions of the information and/or data received from the check circuit 110.

At 508, the machine learning circuit 210 determines whether the information and/or data communicated by the Android application is indicative of a presence of a malicious object in the Android application. In some implementations, the machine learning circuit 210 may compare the information and/or data included in the call generated or initiated by the current instance of the runtime application 120 with the information and/or data included in one or more similar calls 130 generated or initiated in one or more previous instances of the respective runtime application 120. In some implementations, the machine learning circuit 210 may include information from one or more global machine learning models, information from one or more local machine learning models, or combinations thereof to determine whether the information and/or data received from the check circuit 110 indicates the presence of one or more malicious objects in the runtime application 120. The method concludes at 510.

Figure 6:
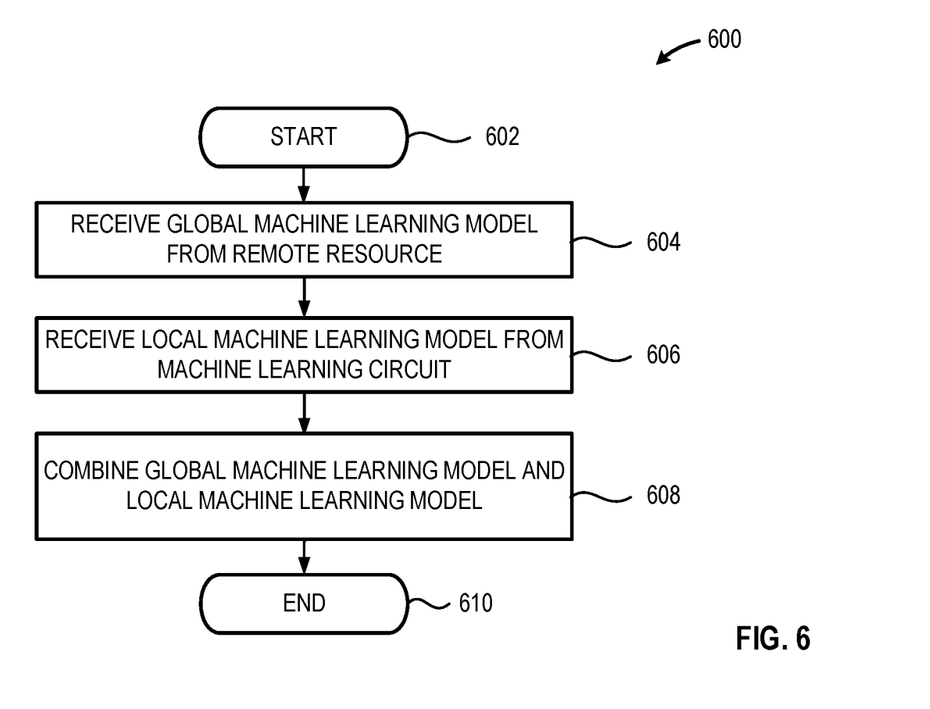
FIG. 6 is a high-level flow diagram of an illustrative machine learning model generation method to update a malicious object detection method, such as that depicted in FIG. 5, in accordance with at least one embodiment described herein.

FIG. 6 provides a high-level flow diagram of an illustrative machine learning model generation method 600, in accordance with at least one embodiment described herein. In some implementations, the machine learning circuit 210 may implement one or more machine learning models 250. In some implementations, the machine learning model 250 may include a composite of one or more global machine learning models combined with one or more local machine learning models. The machine learning model 250 may be implemented by the machine learning circuit 210 using any number and/or combination of electrical components, semiconductor devices, and/or logic elements. The method 600 commences at 602.

At 604, a management circuit 112 and/or the machine learning circuit 210 communicably coupled to the management circuit 112 receives a global machine learning model 280 from one or more remote resources 270. In some implementations, the global machine learning model 280 may include contributions from a plurality of processor-based devices 100. Thus, the global machine learning model 280 may beneficially reflect the aggregated malicious code detection capabilities of a large number of individual processor-based devices 100. In some implementations, the global machine learning model 280 may be stored or otherwise retained in one or more cloud based devices or servers and communicated to the processor-based device 100 via one or more networks 260. In some implementations, the machine learning circuit 210 may implement only the global machine learning model 280.

At 606, the management circuit 112 may communicate or cause to be communicated one or more local machine learning models 230 to the machine learning circuitry 210. The local machine learning model 230 may include or reflect inputs, information, and/or data associated with user inputs to the processor-based device 100 and/or applications 120 executed by the processor-based device 100. Such information and/or data may reflect information and/or habits of a particular user or a particular device. For example, if a user typically uses a first application 120A to access financial information, calls 130A generated by the first application 120A may include information and/or data indicative of a request for the respective financial information. If a second application 120B generates a call 130B that includes information and/or data indicative of a request for financial information, the local machine learning model 230 may provide an indication that such a request is unusual, unauthorized, and/or inappropriate based on prior processor-based device usage. In some implementations, the machine learning circuit 210 may implement only the local machine learning model 230.

At 608, the management circuit 112 and/or the machine learning circuit 210 may combine some or all of the global machine learning model 280 with some or all of the local machine learning model 230. In some implementations, the machine learning circuit 210 may implement the combined global machine learning model 280 and local machine learning model 230 using any number and/or combination of electrical components, semiconductor devices, and/or logic elements. The method 600 concludes at 610.

Figure 7:
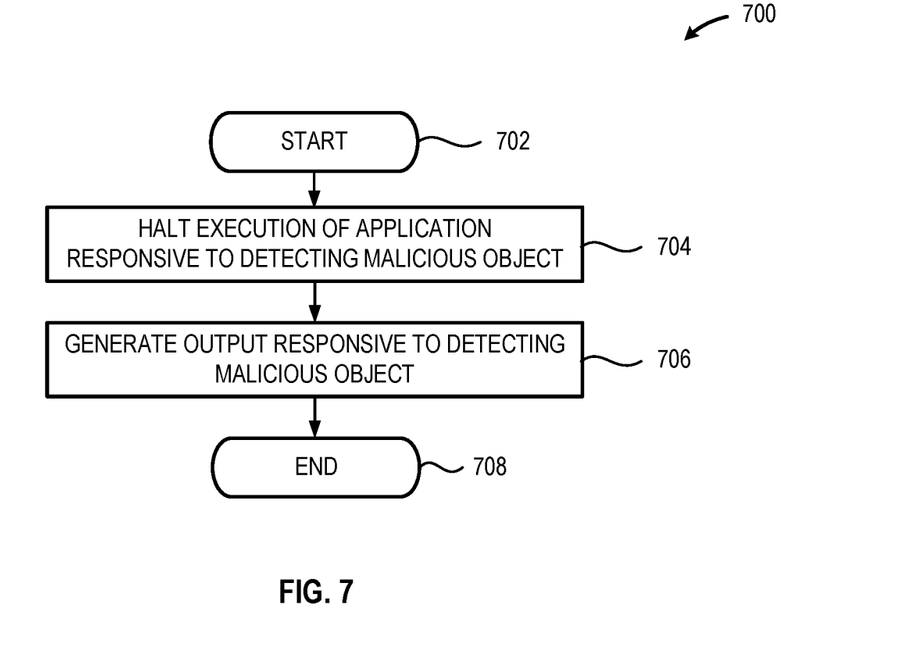
FIG. 7 is a high-level flow diagram of an illustrative response method upon detecting a presence of malicious code in a runtime application by a malicious object detection method such as that depicted in FIG. 5, in accordance with at least one embodiment described herein.

FIG. 7 provides a high-level flow diagram of an illustrative response method 700 upon detecting a presence of malicious code in a runtime Android application, in accordance with at least one embodiment described herein. In addition to detecting the presence of one or more malicious objects in the runtime Android application 120, the management circuit 112 may take protective or preventative measures to protect the processor-based device 100 from exploitation by the malicious object. The method 700 commences at 702.

At 704, responsive to detecting the presence of a malicious object in the runtime application 120, the management circuit 112 causes the processor-based device 100 to cease execution of the application 120. In some implementations, the management circuit 112 may prevent future execution of the respective runtime application 120. In some implementations, the management circuit 112 causes only the present instance of the respective application 120 to cease and permits other, future, instances of the respective application 120 to proceed.

At 706, responsive to detecting the presence of a malicious object in the runtime Android application 120, the management circuit 112 causes the graphical user interface (GUI) management circuit 220 to generate one or more user perceptible outputs indicative of the detection of a malicious object in the runtime application 120. In some implementations, the user perceptible output may include one or more visual outputs on a display coupled to the processor-based device 100. In some implementations, the user perceptible output may include one or more audible outputs using a speaker or speaker jack coupled to the processor-based device 100. The method 700 concludes at 708.

Figure 8:
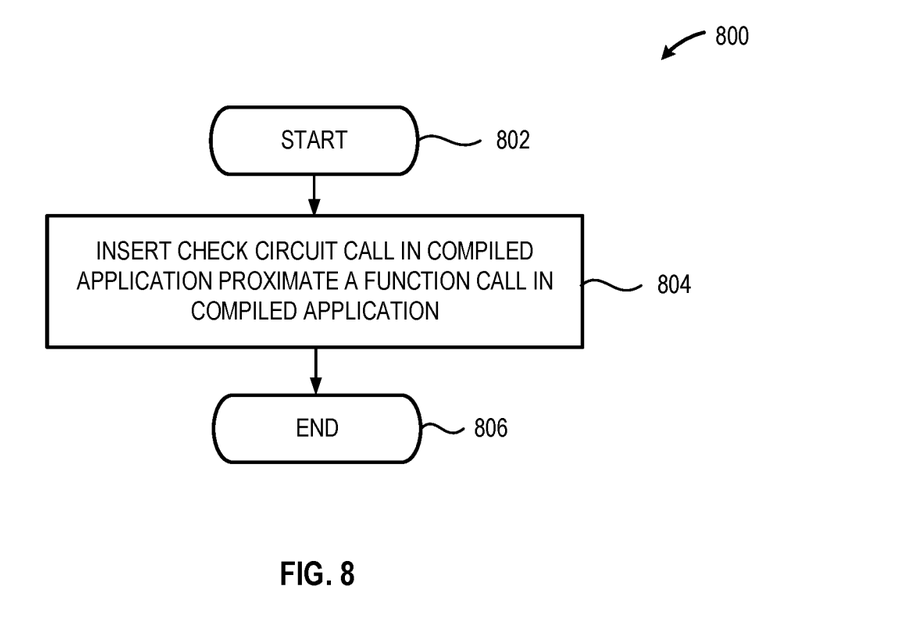
FIG. 8 is a high-level flow diagram of an illustrative compiled application call insertion method that inserts a call proximate at least a portion of the function calls included in a compiled application, in accordance with at least one embodiment described herein.

FIG. 8 provides a high-level flow diagram of an illustrative compiled application call insertion method 800 that inserts a call proximate at least a portion of the function calls included in a compiled application 120, in accordance with at least one embodiment described herein. For example, Android version 4.4 and higher employs Android Runtime (ART) which compiles applications upon installation rather than compiling the application each time the application is executed. Thus, function calls are inserted into the compiled application upon installation of the application on the processor-based device 100. The management circuit 112 inserts check circuit calls into the compiled application proximate at least some of the function calls present in the compiled application. The method 800 commences at 802.

At 804, the management circuit 112 inserts check circuit calls into compiled application 120. The check circuit calls communicate function call information to the check circuit 110 for assessment by the machine learning circuit 210. In embodiments, the management circuit 112 may insert such check circuit calls 130 proximate each function call in the compiled application 120. In embodiments, the management circuit 112 may selectively insert such check circuit calls 130 proximate selected function calls in the compiled application 120. In embodiments, the management circuit 112 may insert check circuit calls 130 proximate a portion of the function calls in the compiled Android application 120. The method 800 concludes at 806.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to example 1, there is provided a system to detect malicious code in a managed runtime executed by a processor based device, the system may include a check circuit to detect an occurrence of a defined event during the runtime of the application executing on the processor-based device; a management circuit communicably coupled to the check circuit, the management circuit including: a machine learning circuit to: assess data communicated by the application to access a resource responsive to detecting the occurrence of the defined event; and determine whether the data communicated by the application is indicative of a presence of a malicious object in the application.

Example 2 may include elements of example 1 and the system may further include at least one communication circuit communicably coupled to the management circuit, where the management circuit further causes the machine learning circuit to receive a machine learning model from at least one source remote from the processor based device via the communication circuit.

Example 3 may include elements of example 1 and the machine learning circuit may further update a machine learning model using the assessed data communicated by the application to access the resource.

Example 4 may include elements of example 1 and the management circuit may further cause the processor-based device to halt execution of the application responsive to detecting the data communicated by the application indicates a presence of a malicious object in the application.

Example 5 may include elements of example 4 and the management circuit may further include a graphical user interface (GUI) management circuit, wherein the management circuit further causes the GUI management circuit to generate a user perceptible output on the processor-based device responsive to detecting the data communicated by the application is indicative of a presence of a malicious object in the application.

Example 6 may include elements of example 1 and the machine learning circuit may further determine whether the data communicated by the application is indicative of a presence of at least one of: a virus or malware in the application.

Example 7 may include elements of example 1 and the check circuit may further detect an occurrence of an application programming interface (API) call during the runtime of the application.

Example 8 may include elements of example 7 and the machine learning circuit may further compare at least a portion of the data communicated by the application in the current API call to the resource with at least a portion of the data communicated by the application in at least one prior API call to the resource.

Example 9 may include elements of example 1 and the management circuit may further insert a check circuit call at locations in a compiled application, each check circuit call proximate a location in the compiled application corresponding to a respective function call present in the compiled application.

Example 10 may include elements of example 9 and the check circuit may further detect an occurrence of the call to the check circuit in the compiled application.

Example 11 may include elements of example 10 and the machine learning circuit may further compare at least a portion of the data communicated included in the current function call in the compiled application with at least a portion of the data communicated included in at least one prior function call in the compiled application.

According to example 12, there is provided a method of detecting malicious code in an application executing on a processor-based device, the method may include detecting, by a check circuit, an occurrence of a defined event during the runtime of the application executing on the processor-based device; responsive to detecting the occurrence of the defined event, selectively causing a machine learning circuit communicably coupled to the check circuit to assess data communicated by the application to access a resource; and determining, by the machine learning circuit, whether the data communicated by the application is indicative of a presence of a malicious object in the application.

Example 13 may include elements of example 12 and the method may further include receiving by the machine learning circuit, via a communicably coupled communication circuit, a machine learning model from at least one source remote from the processor based device.

Example 14 may include elements of example 12 and the method may additionally include updating the machine learning circuit using data from the application executing on the processor-based device.

Example 15 may include elements of example 12 and the method may additionally include, responsive to determining the data communicated by the application indicates a presence of a malicious object in the application, causing the processor-based device to halt execution of the application.

Example 16 may include elements of example 15 and the method may additionally include, responsive to determining the data communicated by the application indicates a presence of a malicious object in the application, causing a graphical user interface (GUI) management circuit to generate a user perceptible output on the processor-based device.

Example 17 may include elements of example 12 where determining whether the data communicated by the application is indicative of a presence of a malicious object in the application may include determining whether the data communicated by the application is indicative of a presence of at least one of: a virus or malware in the application.

Example 18 may include elements of example 12 where detecting an occurrence of a defined event during the runtime of the application may include detecting an occurrence of an application programming interface (API) call during the runtime of the application.

Example 19 may include elements of example 18 where determining whether the data communicated by the application is indicative of a presence of a malicious object in the application may include causing the machine learning circuit to compare at least a portion of the data communicated by the application in the current API call to the resource with at least a portion of the data communicated by the application in at least one prior API call to the resource.

Example 20 may include elements of example 12, and the method may additionally include inserting, by a management circuit, a call to the check circuit at locations in a compiled code, each check circuit call proximate a location corresponding to a respective function call present in the compiled code.

Example 21 may include elements of example 20 where detecting an occurrence of a defined event during the runtime of the application may include detecting an occurrence of the call to the check circuit in the compiled code.

Example 22 may include elements of example 21 where determining whether the data communicated by the application is indicative of a presence of a malicious object in the application may include causing the machine learning circuit to compare at least a portion of the data communicated included in the current function call in the compiled code with at least a portion of the data communicated included in at least one prior function call in the compiled code.

According to example 23, there is provided a non-transitory computer readable medium that includes executable instructions that, when executed by a circuit in a processor-based device transform the circuit to a malicious code detection circuit to: detect an occurrence of a defined event during a runtime of an application executed by the processor-based device; assess data communicated by the application to access a resource responsive to detecting the occurrence of the defined event; and determine whether the data communicated by the application is indicative of a presence of a malicious object in the application.

Example 24 may include elements of example 23 where the instructions may cause the malicious code detection circuit to further receive via a communicably coupled communication circuit, a machine learning model from at least one remote source.

Example 25 may include elements of example 24 where the instructions may cause the malicious code detection circuit to further update the machine learning model using data communicated by the application executed by the processor-based device.

Example 26 may include elements of example 23 where the instructions may cause the malicious code detection circuit to further halt execution of an application responsive to detecting the data communicated by the application is indicative of a presence of a malicious object in the application.

Example 27 may include elements of example 26 where the instructions may cause the malicious code detection circuit to further cause a graphical user interface (GUI) management circuit to generate a user perceptible output on the processor-based device responsive to detecting the data communicated by the application is indicative of a presence of a malicious object.

Example 28 may include elements of example 23 where the instructions that cause the malicious code detection circuit to determine whether the data communicated by the application is indicative of a presence of a malicious object in the application may further cause the malicious code detection circuit to determine whether the data communicated by the application is indicative of a presence of at least one of: a virus or malware in the application.

Example 29 may include elements of example 23 where the instructions that cause the malicious code detection circuit to detect an occurrence of a defined event during a runtime of an application executed by the processor-based device may further cause the malicious code detection circuit to detect an occurrence of an application programming interface (API) call during the runtime of the application.

Example 30 may include elements of example 29 where the instructions that cause the malicious code detection circuit to determine whether the data communicated by the application is indicative of a presence of a malicious object in the application may further cause the malicious code detection circuit to compare at least a portion of the data communicated by the application in the current API call to the resource with at least a portion of the data communicated by the application in at least one prior API call to the resource.

Example 31 may include elements of example 23 where the instructions may cause the malicious code detection circuit to further insert a call to the check circuit at locations in a compiled application, each call to the check circuit at a location in the compiled application corresponding to a respective function call present in the compiled application.

Example 32 may include elements of example 31 where the instructions that cause the malicious code detection circuit to detect an occurrence of a defined event during a runtime of an application executed by the processor-based device may further cause the malicious code detection circuit to detect an occurrence of the call to the check circuit in the compiled application.

Example 33 may include elements of example 32 where the instructions that cause the malicious code detection circuit to determine whether the data communicated by the application is indicative of a presence of a malicious object in the application may further cause the malicious code detection circuit to compare at least a portion of the data communicated included in the current function call in the compiled application with at least a portion of the data communicated included in at least one prior function call in the compiled application.

According to example 34, there is provided a system for detecting malicious code during a runtime of an application executed by a processor based device. The system may include a means for detecting an occurrence of a defined event during the runtime of the application executing on the processor-based device; a means for assessing data communicated by the application to access a resource responsive to detecting the occurrence of the defined event; and a means for determining whether the data communicated by the application is indicative of a presence of a malicious object in the application.

Example 35 may include elements of example 34, and the system may further include a means for receiving a machine learning model from at least one source remote from the processor based device.

Example 36 may include elements of example 35, and the system may include a means for updating the machine learning model using data from the application executing on the processor-based device.

Example 37 may include elements of example 34, and the system may further include a means for causing the processor-based device to halt execution of the application responsive to detecting the data communicated by the application is indicative of a presence of a malicious object in the application.

Example 38 may include elements of example 37, and the system may further include a means for generating a user perceptible output on the processor-based device responsive to detecting the data communicated by the application is indicative of a presence of a malicious object in the application.

Example 39 may include elements of example 34 where the means for determining whether the data communicated by the application is indicative of a presence of a malicious object in the application may include a means for determining whether the data communicated by the application is indicative of a presence of at least one of: a virus or malware in the application.

Example 40 may include elements of example 34 where the means for detecting an occurrence of a defined event during the runtime of the application may include a means for detecting an occurrence of an application programming interface (API) call during the runtime of the application.

Example 41 may include elements of example 40 where the means for determining whether the data communicated by the application is indicative of a presence of a malicious object in the application may include a means for comparing at least a portion of the data communicated by the application in the current API call to the resource with at least a portion of the data communicated by the application in at least one prior API call to the resource.

Example 42 may include elements of example 34, and the system may additionally include a means for inserting a call to the check circuit at locations in a compiled application, each call to the check circuit at a location in the compiled application corresponding to a respective function call present in the compiled application.

Example 43 may include elements of example 42 where the means for detecting an occurrence of a defined event during the runtime of the application may include a means for detecting an occurrence of the call to the check circuit in the compiled application.

Example 44 may include elements of example 43 where the means for determining whether the data communicated by the application is indicative of a presence of a malicious object in the application may include a means for comparing at least a portion of the data communicated included in the current function call in the compiled application with at least a portion of the data communicated included in at least one prior function call in the compiled application.

According to example 45, there is provided a system for detecting malicious code during a runtime of an application executed by a processor based device, the system being arranged to perform the method of any of examples 12 through 22.

According to example 46, there is provided a chipset arranged to perform the method of any of examples 12 through 22.

According to example 47, there is provided a non-transitory machine readable medium comprising a plurality of instructions that, in response to be being executed on a computing device, cause the computing device to carry out the method according to any of examples 12 through 22.

According to example 48, there is provided a device to detect malicious code during a runtime of an application executed by a processor based device, the device being arranged to perform the method of any of the examples 12 through 22.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system to locally detect malicious code in a managed runtime system on a processor-based device, the system comprising:
   a check circuit local to the processor-based device, the check circuit to detect an occurrence of a defined event during the runtime of an application executing on the processor-based device, wherein the occurrence is detected by monitoring runtime application programming interface (API) invocations from user application code to runtime management instructions of the processor-based device;
   a management circuit local to the processor-based device and communicatively coupled to the check circuit, the management circuit including:
      a machine learning circuit local to the processor-based device to:
         assess, responsive to detecting the occurrence of the defined event, data communicated by the application to access a resource; and
         determine whether the data communicated by the application is indicative of a presence of a malicious object in the application,
         wherein the check circuit and/or the management circuit modify the user application code to at least partially direct function calls to the check circuit to enable monitoring of the function call.

2. The system of claim 1, further comprising:
   at least one communication circuit communicatively coupled to the management circuit; and
      wherein the management circuit further causes the machine learning circuit to receive a machine learning model from at least one source remote from the processor-based device via the communication circuit.

3. The system of claim 1, the machine learning circuit to further:
update a machine learning model stored on the processor-based mobile device using the assessed data communicated by the application to access the resource.

4. The system of claim 1, the management circuit to further:
cause the processor-based device to halt execution of the application responsive to detecting the data communicated by the application indicates a presence of a malicious object in the application.

5. The system of claim 4, the management circuit further comprising:
a graphical user interface (GUI) management circuit, wherein the management circuit further causes the GUI management circuit to generate a user perceptible output on the processor-based device responsive to detecting the data communicated by the application is indicative of a presence of a malicious object in the application.

6. The system of claim 1, the machine learning circuit to further:
determine whether the data communicated by the application is indicative of a presence of at least one of a virus or malware in the application.

7. The system of claim 1, the check circuit to further:
detect an occurrence of an application programming interface (API) call during the runtime of the application.

8. The system of claim 7, the machine learning circuit to further:
compare at least a portion of the data communicated by the application in the current API call to the resource with at least a portion of the data communicated by the application in at least one prior API call to the resource.

9. The system of claim 1, the management circuit to:
insert a check circuit call at locations in a compiled application, each check circuit call proximate a location in the compiled application corresponding to a respective function call present in the compiled application.

10. The system of claim 9, the check circuit to further:
detect an occurrence of the call to the check circuit in the compiled application.

11. The system of claim 10, the machine learning circuit to further:
compare at least a portion of the data communicated included in the current function call in the compiled application with at least a portion of the data communicated included in at least one prior function call in the compiled application.

12. A method of detecting malicious code in a managed runtime system on a processor-based device, the method comprising:
detecting, by a check circuit local to the processor-based device, an occurrence of a defined event during the runtime of an application executing on the processor-based device, wherein the occurrence is detected by monitoring runtime application programming interface (API) invocations from user application code to runtime management instructions of the processor-based device;
responsive to detecting the occurrence of the defined event, selectively causing a machine learning circuit communicatively coupled to the check circuit to assess data communicated by the application to access a resource, the machine learning circuit being local to the processor-based device; and
determining, by the machine learning circuit, whether the data communicated by the application is indicative of a presence of a malicious object in the application,
wherein the check circuit and/or a management circuit modify user application code to at least partially direct function calls to the check circuit to enable monitoring of the function call, wherein the management circuit includes the machine learning circuit.

13. The method of claim 12, further comprising:
receiving by the machine learning circuit, via a communicatively coupled communication circuit, a machine learning model from at least one source remote from the processor-based device.

14. The method of claim 12, further comprising:
updating the machine learning circuit using data from the application executing on the processor-based device.

15. The method of claim 12, further comprising:
responsive to determining the data communicated by the application indicates a presence of a malicious object in the application, causing the processor-based device to halt execution of the application.

16. The method of claim 15, further comprising:
responsive to determining the data communicated by the application indicates a presence of a malicious object in the application, causing a graphical user interface (GUI) management circuit to generate a user perceptible output on the processor-based device.

17. The method of claim 12 wherein determining whether the data communicated by the application is indicative of a presence of a malicious object in the application comprises:
determining whether the data communicated by the application is indicative of a presence of at least one of: a virus or malware in the application.

18. The method of claim 12 wherein detecting an occurrence of a defined event during the runtime of the application comprises:
detecting an occurrence of an application programming interface (API) call during the runtime of the application.

19. The method of claim 18 wherein determining whether the data communicated by the application is indicative of a presence of a malicious object in the application comprises:
causing the machine learning circuit to compare at least a portion of the data communicated by the application in the current API call to the resource with at least a portion of the data communicated by the application in at least one prior API call to the resource.

20. The method of claim 12, further comprising:
inserting, by a management circuit local to the processor-based device, a call to the check circuit at locations in a compiled application code, each check circuit call proximate a location corresponding to a respective function call present in the compiled application code.

21. The method of claim 20 wherein detecting an occurrence of a defined event during the runtime of the application comprises:
detecting an occurrence of the call to the check circuit in the compiled application code.

22. The method of claim 21 wherein determining whether the data communicated by the application is indicative of a presence of a malicious object in the application comprises:
causing the machine learning circuit to compare at least a portion of the data communicated included in the current function call in the compiled application code with at least a portion of the data communicated included in at least one prior function call in the compiled application code.

23. A non-transitory computer readable medium that includes executable instructions that, when executed by a circuit in a processor-based device, transform the circuit to a malicious code detection circuit to:

detect, via a check circuit local to the processor-based device, an occurrence of a defined event during a runtime of an application executed by the processor-based device, wherein the occurrence is detected by monitoring runtime application programming interface (API) invocations from user application code to runtime management instructions of the processor-based device;

assess, responsive to detecting the occurrence of the defined event and via a machine learning circuit that is communicatively coupled to the check circuit and local to the processor-based device, data communicated by the application to access a resource; and determine, via the machine learning circuit, whether the data communicated by the application is indicative of a presence of a malicious object in the application, wherein the check circuit and/or a management circuit modify user application code to at least partially direct function calls to the check circuit to enable monitoring of the function call, wherein the management circuit includes the machine learning circuit.

24. The non-transitory computer readable medium of claim 23 wherein the instructions cause the malicious code detection circuit to further:

receive, via a communicatively coupled communication circuit, a machine learning model from at least one remote source.

25. The non-transitory computer readable medium of claim 24 wherein the instructions cause the malicious code detection circuit to further:

locally store the received machine learning model; and
update the locally stored machine learning model using data communicated by the application executed by the processor-based device.

* * * * *